United States Patent [19]

Mesenich

[11] Patent Number: 5,207,205
[45] Date of Patent: May 4, 1993

[54] FUEL INJECTION DEVICE WITH AIR-ASSISTED FUEL DIFFUSION

[75] Inventor: Gerhard Mesenich, Witten, Fed. Rep. of Germany

[73] Assignee: Siemens Automotive L.P., Auburn Hills, Mich.

[21] Appl. No.: 679,068

[22] PCT Filed: Dec. 6, 1989

[86] PCT No.: PCT/US89/05511
§ 371 Date: Oct. 10, 1991
§ 102(e) Date: Oct. 10, 1991

[51] Int. Cl.⁵ .................. F02M 69/08; F02M 51/02
[52] U.S. Cl. .................. 123/533; 123/531; 239/585.1; 251/129.16
[58] Field of Search .................. 123/531, 533; 251/129.16; 239/585, 407, 408

[56] References Cited

U.S. PATENT DOCUMENTS

| | | |
|---|---|---|
| 4,224,915 | 9/1980 | Emmenthal et al. .................. 123/533 |
| 4,572,436 | 2/1986 | Stettner et al. .................. 251/129.16 X |
| 4,610,425 | 9/1986 | Kelly .................. 251/129.2 |
| 4,708,117 | 11/1987 | Mesenich et al. .................. 123/533 |
| 4,958,773 | 9/1990 | Stettner et al. .................. 251/129.16 X |

FOREIGN PATENT DOCUMENTS

| | | |
|---|---|---|
| 249313 | 12/1987 | European Pat. Off. . |
| 261855 | 3/1988 | European Pat. Off. . |
| 306739 | 3/1989 | European Pat. Off. . |

*Primary Examiner*—Tony M. Argenbright
*Attorney, Agent, or Firm*—George L. Boller; Russel C. Wells

[57] ABSTRACT

The fuel injector valves are disposed within the fuel manifold; they have no housings and are completely immersed in liquid fuel.

21 Claims, 4 Drawing Sheets

FUEL INJECTION DEVICE WITH AIR-ASSISTED FUEL DIFFUSION

The subject of the invention concerns a device for the injection of fuel into the suction pipe of combustion motors. The device belongs to the category of injection systems with air-assisted fuel diffusion. The fuel is metered by means of one or more electromagnetic values and is then transported with the assistance of air to the individual injection locations via small diameter conduits. In addition, a suitable air pump for the generation of pressurized air is described, which functions in conjunction with the fuel injection device and is driven directly by the combustion motor itself.

OBJECTIVE OF THE INVENTION AND STATE OF THE ART

The basic design of a device for fuel injection with air-assisted fuel diffusion is familiar, for instance from DE-OS 2920636 (Emmenthal et. al.). In the referenced application no detailed descriptions for construction of the injection device are made.

A practically useful design example of such a device is described in U.S. Pat. No. 4,708,117. The electromagnetic valve of this device features a flat valve seat with an annular channel. By means of the annular channel very good precision of fuel distribution to the individual cylinders of the combustion motor is achieved. However, the electromagnetic metering valve must be built with a high degree of precision, causing difficulties in manufacturing. Despite the high precision requirements in manufacturing, the sealing capacity of the valve seat is often unsatisfactory. Furthermore, the speed of the opening and closing movements, and their reproducibility, is not always adequate for the desired metering precision in the case of this valve. Alternatively, the use of a ball-type valve obturator has been proposed. With the use of this type of obturator it becomes necessary to arrange the individual metering nozzles in close proximity to each other. This in turn leads to mutual interaction between the flows to the individual nozzles. This type of nozzle arrangement below a ball-type valve obturator results usually in unsatisfactory precision of fuel distribution.

It is furthermore state of the art, to assign an individual injection valve to each cylinder of the combustion motor, and to equip these injectors with devices for the air-assisted fuel diffusion. The injection valves are then usually supplied by means of a fuel manifold which is located above the injection valves. This results in high costs and a rather undesirable additional equipment height above the individual valves. In addition, mounting such an injection system is complicated due to the fact that a multiplicity of individual elements and connections results. Because of the relatively large distance of the injection nozzles, strong pressure variations arise inside the individual valves, and, because of the impaired perfusion of the individual valves with fresh fuel, hot-start problems occur frequently.

Air consumption of this type of injection device with air assisted fuel diffusion decreases with increasing amount of injected fuel. This behavior is attributable to the fact that, as the amount of injected material increases, fuel progressively blocks the supply lines, impeding the air flow. This feature considerably complicates adaptation of the rated performance of an air pump to the rated requirements of the injection device.

For state of the art systems, an electrically driven air pump is used to generate the compressed air. The electric drive for the air pump causes increased manufacturing costs. Therefore, it has been desirable to use an air pump which is directly mechanically, driven by the combustion motor itself. The use of such pumps has already been proposed several times. The state of the art pumps, however, feature an extraordinarily unfavorable response curve for the amount of air delivered. With directly driven mechanical pumps, the amount of air delivered increases approximately linearly with the number of revolutions, on the other hand, the amount of air required by the injection device decreases with increasing number of revolutions. With state of the art pumps it is therefore necessary to employ complicated and costly means to limit their output.

Applicant has proposed an injection valve with tilt-armature in the published German Application P 3834445.9; this device allows for extraordinarily fast floating movements and is easy to manufacture. This injector valve, however, is saddled with the disadvantage that the flat tilt-armature can only be adapted to the usual requirements for rotationally symmetrical mounting conditions by more complicated manufacturing measures. It is the objective of this invention to further develop this injection valve, featuring a tilt-armature, to a simple fuel injection device which allows for an especially simple adaptation to the mounting requirements at the enginge, despite the appearance of the initially unfavorable shape of this valve. The injection device shall make use of the known advantages of air-assisted fuel diffusion, and shall simultaneously supply several cylinders of a combustion engine with fuel. The fuel injection device shall allow for especially cost efficient, uncomplicated manufacture, together with improved linearity and repeatability of fuel metering. The compressed air for fuel transport shall be produced by a simple, mechanically driven air pump.

BRIEF DESCRIPTION OF DRAWINGS

FIG. 1b is a vertical cross-section, as along line 1B—1B in FIG. 1a.

FIG. 2b is a top view of a portion of FIG. 2a.

FIG. 7b is a top plan view, generally along line 7A—7A of FIG. 7a.

FUEL INJECTION DEVICE ACCORDING TO THIS INVENTION

Figure 1B:
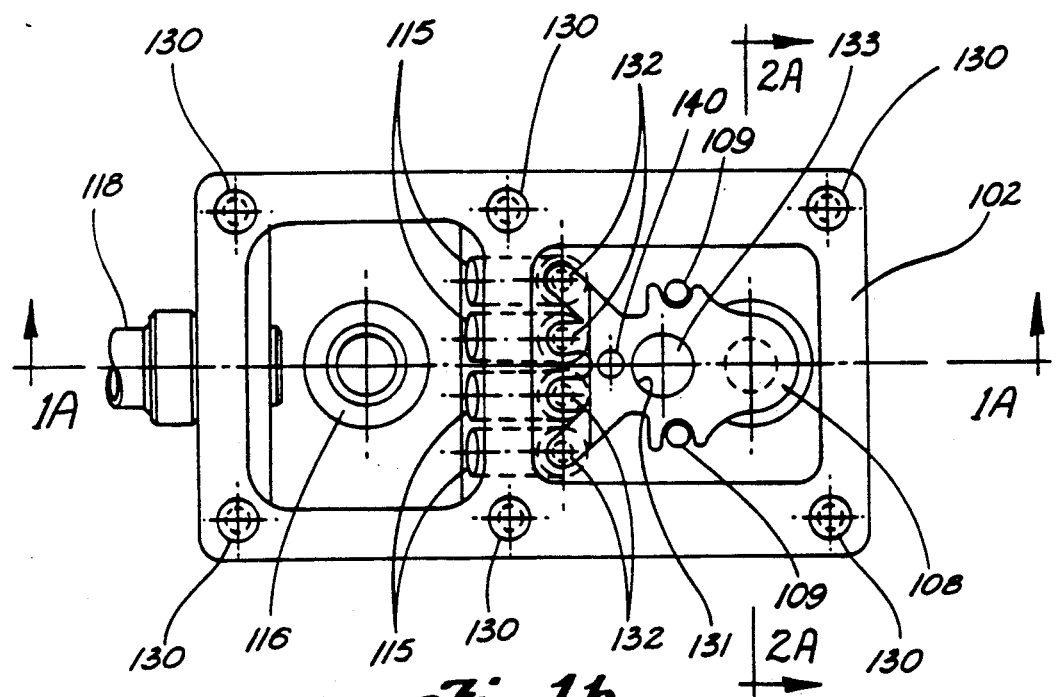
Figure 1A:
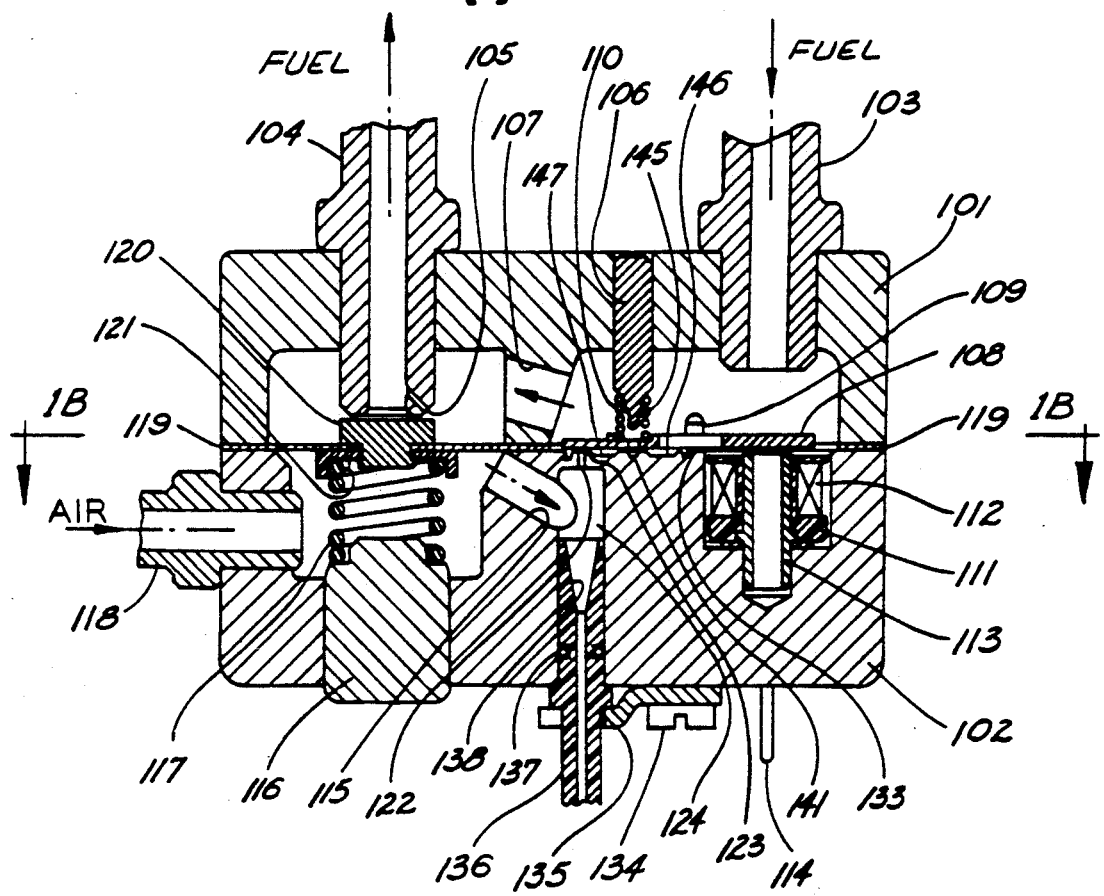
FIG. 1a is a vertical cross-section through a fuel injection device of the invention, as along line 1A—1A in FIG. 1b.

The injection device according to the invention consists of a multifunctional composite in which an electromagnetic metering valve, a fuel pressure regulator, and several mixing chambers are integrated to one mounting part for the purpose of fuel delivery. The elctromagnetic valve features a flat tilt-armature which can seal several valve seats. An alternative design can also be equipped with several individual valves. Inside the individual valve seats a separate single metering nozzle is provided, respectively coordinated to each individual cylinder of the combustion engine. The injection device comprises fuel conduits which serve for injection of the fuel into the suction tube of the combustion engine. A preferred design of the injection device is shown is cross-sectional view in FIG. 1a. The armature of the electromagnetic valve and the membrane of the pressure regulator are located in the same plane. Fuel supply, fuel recycle, and compressed air supply are defined by the directional arrows. FIG. 1b provides a top view of valve carrier 102. The cross-sectional drawing shown in FIG. 1a corresponds to the axis A—A shown in FIG. 1b. Identical parts are marked by the same reference numbers. The valve shown in FIG. 1 features four separate metering systems to supply a four-cylinder motor with fuel. The external dimensions of the injection device, in the design shown, are 70×40×40 mm. The injection device will be further detailed in the following, based on FIGS. 1a and 1b:

The housing of the injection device consists of valve carrier 102 and housing cover 101. Housing cover 101 is connected to valve carrier 102 by threaded connections. The screws are located at the outer periphery of cover 101 and fit into threaded holes 130. Membrane 119 is clamped between valve carrier 102 and housing cover 101. The thickness of membrane 119 is preferably about 0.5 mm. Membrane 119 consists of elastic material and serves to seal the injection device. In addition, membrane 119 provides the bearing the obturator 120 of the fuel pressure regulator. Pressurized fuel flows via intake connector 103 to the magnetic valve region. From there, the fuel proceeds via passage 107 to the pressure regulator. Exiting from the pressure regulator, fuel flows via connector 104 to fuel recycle.

The fuel pressure regulator is in principle a state of the art device, and is designed as a differential pressure controller. By means of such differential pressure regulators, fuel pressure is maintained to a nearly constant amount above the compressed air pressure, even as the compressed air pressure varies. Thus, at metering nozzles 122 a virtually constant differential fuel pressure is effective. The differential fuel pressure preferably is approximately 1 bar. The compressed air pressure is widely variable, depending on the delivery characteristics of the air pump employed, the pressure in the induction tube of the motor, and the amount of injected fuel. Compressed air pressure usually exceeds atmospheric pressure by several 0.1 bar in the case of an idling engine. Under full load, compressed air pressure may exceed atmospheric pressure by as much as 2 bar. Membrane 119, in the pressure regulation region, is impacted by the fuel pressure on its upper side, and by the compressed air pressure on its lower side. As differential fuel pressure increases, obturator 120 is lifted against the forces exerted by governing spring 117 and the air pressure of compressed air in exit connector 104. This causes freeing of an annular slot between obturator 120 and exit connector 104, allowing the pressurized fuel to pass to the virtually unpressured fuel recycle section. Obturator 120 of the pressure regulator is supported by spring bearing 121. Spring 117 of the pressure regulator is borne by pin 116. Pin 116 is pressure fitted into valve carrier 102. The desired differential fuel pressure is set by the depth of insertion of pin 116. In place of the simple obturator described here, gimbal mounted obturators, which are conventional to pressure control technology, may also be used.

Compressed air enters via connector 118 into the air space of the pressure regulator. From there it passes via passages 115 to mixing chambers 124. The conduits for fuel mixture, 136, are inserted into mixing chambers 124. Transport conduits 136 are provided with tapered entry sections 138 and are held in place by mounting clip 135. Gaskets 137 provide the necessary seal. The fuel-air mixture is conducted via conduits 136 to the injection locations in the induction tube of the engine. The internal diameter of conduits 136 should be 1.5–2 times the diameter of the nozzles. Thus, the internal diameter of conduits 136 is about 0.8–1.2 mm. Conduits 136 are preferably made of plastic materials. The diameter of mixing chambers 124 and passages 115 is preferably about 3 mm.

The magnetic circuit of the valve is defined by magnet core 113, flat armature 108, and valve carrier 102. All these components consist of low-retentivity magnetic substances. Magnetic excitiation is by means of magnetic coil 112, which is coiled onto coil body 111. Electrical connection is via contact pins 114. Armature 108 may be provided with a non-magnetic coating on its underside to establish a permanent air gap. By means of such permanent air gaps the reset-time of the magnetic valve is shortened; a state of the art feature.

Flat armature 108 is in the shape of a tilt-lever with fulcrum on bearing element 133. Bearing element 133 is arranged between fitting pins 109. Fitting pins 109 are pressure fitted into valve carrier 102 and provide lateral guidance to armature 108. The facing surface of magnetic core 113 is reset from the plane of the armature bearing. Armature stroke corresponds to the measure of reset of the facing surface. Bearing element 133 should be located at such distance from magnetic core 113 and valve seats 123, that a mechanical advantage with increased armature stroke results in the valve seat region. Armature stroke in the valve seat region preferably is about 0.1–0.15 mm, while the stroke at the magnet core is preferably 0.05–0.1 mm. Armature thickness is preferably 0.8–1 mm. armature mass is about 2 g.

Armature reset is be means of reset-spring 110. Reset-spring 116 is borne by calibration pin 106. Calibration pin 106 is provided with an extension 145 which prevents spring 110 from dropping off during mounting of the injection device. During mounting, armature 108 is fixed by electrically exciting magnetic coil 112, so that the armature does not drop out. Assembly then proceeds by placing valve carrier 102 onto cover 101, followed by threading both together. To provide for easier assembly, cover 101 may alternatively be extended downwards close to armature 108, with the rest-spring then located in a drilled hole in cover 101. Under these conditions falling out of armature 108 and reset-spring 110 is prevented by the extended cover 101. Dynamic calibration of the valve is done by state of the art procedures involving the depth of insertion of the calibration pin.

Armature 108 is additionally supported by limit stop 141 at the bearing location 140 of reset-spring 141. Limit stop 141 prevents unacceptable bending of armature 108 under the influence of the force of the reset-spring. Valve seats 123 are directly machined into valve carrier 102. Valve seat diameter is preferably about 2 mm. Bearing element 133, limit stop 14 and valve seats 123 are all located in the same plane. Between these parts, damping pockets 146 and 147 are arranged, which are preferably fashioned together by stamping of the valve carrier. Alternatively, such damping pockets may also be provided in armature 108. For the given armature design, the depth of the damping pockets should be about 0.2 mm. This relatively large depth of the damping pockets is necessary because of the large fuel displacing surface of armature 108. The function and manufacture of the damping pockets is described in detail in published German Patent Application P 3834447 (Electromagnetic Fuel Injector and Methods for its Manufacture).

Armature 108 is preferably manufactured by stamping. Armature 108 should be provided with thin lamellar extensions 132 in the region of valve seats 123. These thin lamellae should have a thickness of about 01.–02 mm. This provides for a certain elasticity of the armature in the valve seat region, and improves the sealing capacity of the valve seats. Alternatively, armature 108 may also be equipped with thin plastic obturators to improve sealing capacity. A further alternative would provide for arranging the individual metering nozzles within one single extended valve seat. With such an arrangement of several metering nozzles inside a single valve seat, the danger of mutual interference of the flow to the individual nozzles arises. Therefore, the arrangement of several separate valve seats, as shown, in general is favored with respect to hydraulic considerations. To reduce weight and hydraulic forces during armature movement, armature 108 is provided with perforation 131. Armature 108 can additionally be provided with stamped ribs, or may be flanged at the outside or at the perforation, in all cases measures to improve its flexural strength. The injection device according to the invention offers a multiplicity of essential advantages in comparison with state of the art devices: To start, there is the advantage of simplicity of construction, where tolerances essential to the functioning of the device can be maintained by simple production methods with extreme precision. Finishing of the bearing plane of valve carrier 102 is preferably achieved by a simple surface grinding process. This is followed by stamping the damping pockets and valve seats into the flat surface of valve carrier 102. Valve carrier 102 may also be executed as a sintered part, allowing for omission of the grinding and stamping steps, as long as the production of the sintered piece is done with enough precision. Furthermore, it is possible to fashion the individual seating regions by stamping them, providing for the possibility of centering the stamping tool by means of a pin directly in the nozzle holes. This results in an exactly centered location of the valve seat with respect to the nozzle opening. Such a method of production guarantees uniform inflow conditions to the nozzle region. Final finishing of the bearing surface of valve carrier 102 should always be done by flat-lapping. The final finishing step for the armature also is by means of a flat-lapping step.

By arranging membrane 119 in the dividing plane of the housing, it is not necessary to employ extensive sealing measures. The supply connectors can be arranged freely in any location, providing for ready adaptability to changing mounting requirements. For example, air supply to the pressure regulator can be arranged to be directly via bearing pin 116, which is then fashioned as a connection piece. Design of the injection device in line with the instant invention provides for large and short cross-sectional diameters, with the pressure regulator being close to valve seats 123. This results in considerable reduction of hydraulic and pneumatic pressure variations, and decreases the danger of icing. All of the feed channels 115 to mixing chambers 124 can be executed with the same length. This guarantees identical oscillation and flow conditions with respect to the individual metering nozzles. The pressure controller can readily follow the pressure pulsations of the air pump, without this leading to unacceptable phase dislocations of the differential fuel pressure above the metering nozzles. Stable hydraulic conditions result, combined with very good linearity of fuel metering.

In order to achieve the lowest possible amplitude of hydraulic pressure variations, the cross-section of connecting passage 107, between valve and controller, should be made as large as possible. Connection passage 107 should be executed to this effect as a short, broad channel, covering as much of the total width of the controller as possible. The design of the injection device in keeping with the present invention allows for an extraordinarily large cross-section of connection channel 107. In addition, the cross-section of feed connector 103 should be kept as small as possible in relation to the cross-section of 107. Favorable conditions are achieved for a feed connector cross-section of about 5 mm$^2$ for 103, and a cross-section of about 100 mm$^2$ for 107. By these measures, the formation of damaging pressure waves in the valve is considerably reduced, and their propagation into the feed conduits is largely prevented.

The injection device exhibits excellent characteristics with respect to hot-starting. The complete fuel stream is supplied via the magnetic valve. The valve seats are located directly in the main fuel stream. This guarantees fresh fuel being supplied to the valve seat region even under possible vapour-lock conditions.

With state of the art fuel injection devices, full fuel pressure is maintained for several hours even after engine shutoff. This is necessary to prevent evaporation of the fuel from the injection valve and thus to guarantee fuel supply to the injector during a hot-start of the engine. To maintain fuel pressure a checkvalve is installed in the feed line to the injection valve; this prevents fuel flow-back through the feed line. This involves tough requirements for the tightness of the valve seats, and the seat of the pressure regulator, to prevent untimely dropping off of the fuel pressure. In contrast, the excellent hot-starting ability of the injection device according to the instant invention makes it possible to lower fuel pressure to atmospheric conditions immediately after shutting of the engine. To this effect, a side stream line for fuel is connected parallel to the pressure regulator. To establish this by-pass stream, return flow connector 104 is provided with a small drilled passage 105, its diameter should be of the order of 0.2 mm. The advantage of this lowering of the pressure lies in reduced tightness requirements for the valve seats and in improved working conditions for the fuel pump. Thus, during startup the fuel pump only works against an initially low pressure, guaranteeing the quick flushing out of vapour bubbles. Even under unfavorable starting conditions, fresh fuel will usually be supplied to the injection system within less than a second. The desired by-pass can also be achieved by a rough grinding of the valve seat of the pressure regulator. This measure allows for a further reduction in costs.

Calibration of the injection device is done jointly for both the pressure regulator and the electromagnetic valve. To this effect, valve stroke should be chosen to be as high as possible so that at the individual valve seats fuel flow is choked only to the slightest degree. Static flow is set by setting the differential fuel pressure. Special calibration of armature stroke is not necessary. Dynamic flow characteristics are set by conventional means, by varying the reset-spring force.

For the injection device according to the instant invention a canting of the valve obturators with respect to the valve seats is impossible, given the specific design used. This makes for stable and uniform flow conditions in the individual seat regions, even so the armature stroke is very small. Uniform fuel distribution is thus guaranteed, even for small armature strokes; this in contrast to the state of the art injection devices of this type. Therefore, in spite of the individual valve seats, the alternative exists to calibrate static flow via changing armature stroke height. Setting of the armature stroke is possible by respective changes in the depth of insertion of magnet core 113, either by pressure fitting or threading. Separate calibration of the controller is then not necessary.

The fuel injection device according to FIG. 1 is equipped with a simple electromagnet where magnetic return flow occurs directly by means of the magnetizable valve housing 102. In the following two additional suitable magnetic circuits are proposed for activating the valve; these can be installed as alternatives in the injection device according to FIG. 1, with location as indicated by section line B—B.

Figure 2A:
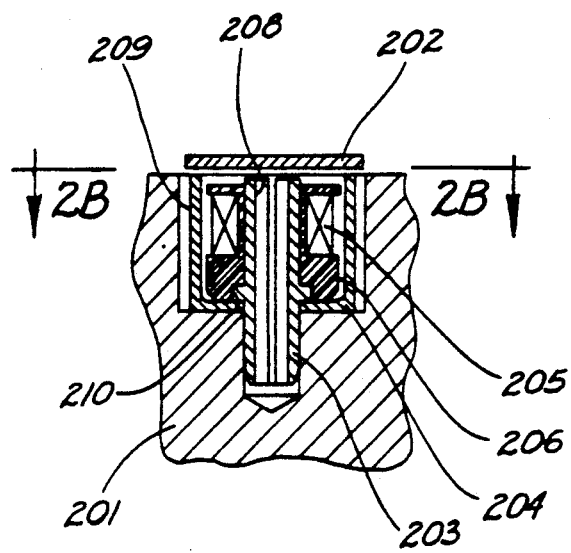
FIG. 2a is a fragmentary view of a modification to a portion of the device.
Figure 2B:
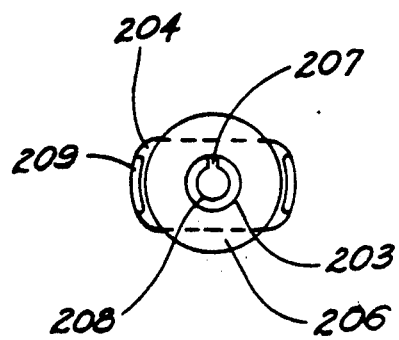

FIG. 2 describes an electromagnet with return flow via a yoke 204. The electromagnet is shown in cross-sectional view in FIG. 2a, in top view in FIG. 2b. Identical parts are listed with the same reference numbers.

In FIG. 2, the magnetic circuit consists of flat armature 202, magnet core 203, and the return flow part 204. These components are made of low retentivity material. The return flow part 204 takes the shape of a yoke and can be manufactured as a stamped or sintered item. The yoke shape reduces the magnetic resistance between the outer surface of magnet core 203 and the inner surface of part 204 and thus reduces the stray field of the magnetic circuit. Magnet core 203 is pressure fitted into valve carrier 201. Valve carrier 201 should be made of non-magnetizable materiel, since otherwise the magnetic circuit would be partially shorted out. Magnet core 203 can be provided with a longitudinal slot 207. This slot serves to prevent eddy currents and facilitates pressure fitting of magnet core 203. Yoke 204 is clamped by collar 210 of magnet core 203. Magnet core 203 contains coil body 203 onto which coil 205 is wound. The center pole surface 208 should be of about the same magnitude as the total surface of the two side poles 209 together. As the armature is energized, it closes against the two side poles 209, while a permanent air gap of preferably about 0.05 mm remains between the armature and center pole surface 208. Alternatively, it is possible to arrange for two permanent air gaps in the region of the two side poles 209, a measure which is less advantageous from magnetic considerations. On the other hand, yoke 204 is largely relieved of mechanical stresses if the permanent air gaps are arranged at the side poles. This has advantages from a vibration technical point of view. Final finishing of the pole surfaces should be done together with the valve carrier after mounting.

Figure 3:
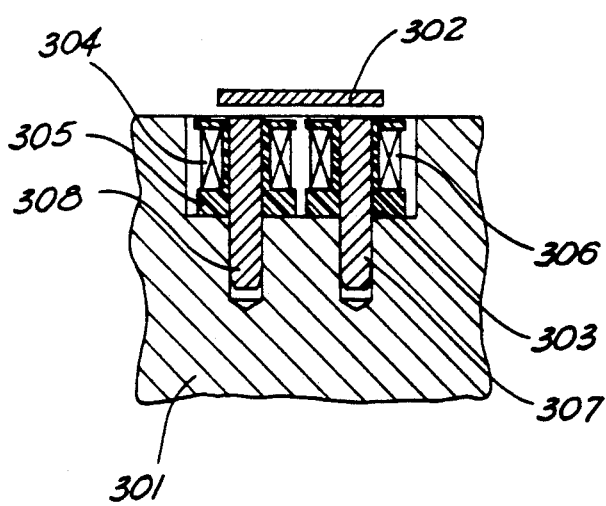
FIG. 3 is a view like FIG. 2a, showing a modification.

Another suitable design for the magnetic circuit is shown in FIG. 3. In this case the circuit features two magnet cores 307 and 308, which are pressure fitted into valve carrier 301. The cores carry coil bodies 303 and 305, onto which coils 304 and 306 are wound. The always necessary permanent air gap is formed by non-magnetizable valve carrier 301. Armature 302 closes directly against the magnet cores in the energized state. Coils 304 and 306 are excited together and are electrically in parallel or series connection. The coils are magnetized in such a way that current flow in the two coils is in opposite directions. This magnetic circuit design offers the advantage of simple and stable mechanical construction, combined with especially low stray field generation.

Figure 4:
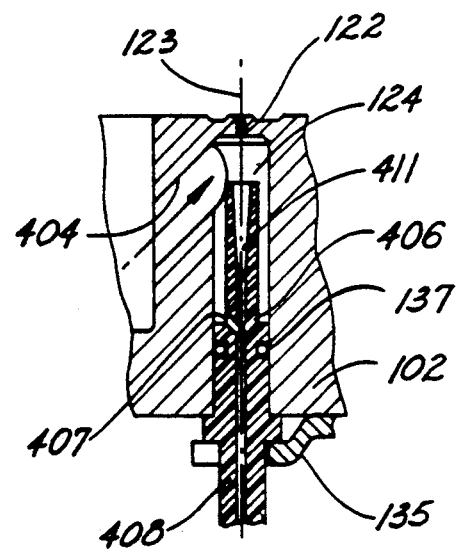
FIG. 4 is a fragmentary view of a modification to another portion of the device.

FIG. 4 shows an alternative mixing device which offers advantages in fuel-mix generation, especially for very low pressure transport air. Conduit 408 in this case is provided with additional side-passages 406 and 407, these allow for additional air access from the side. This causes the fuel to foam up in the conduits at low air pressure. Such low pressures can arise during motor startup when the injection device is driven by a mechanical pump, or when the injection device is provided with air at only atmospheric pressure.

The mixing device according to FIG. 4 is of similar design as that shown in FIG. 1. What is shown is a segment of valve carrier 102. Identical parts in both FIGS. 1 and 4 are given the same reference numbers. Compressed air from the pressure controller enters mixing chamber 124 via passage 404. Passage 404 points toward injection nozzle 122, so that injection occurs about into the flooding point of the admitted air. This measure reduces the impact of pneumatic pulsations on the linearity of metered fuel supply. Fuel-mix conductor 408 is inserted into mixing chamber 124. The upper segment of conduit 408 contains the tapered feed adaptor 411. Side stream air passes along the outside of 411 to side passages 406 and 407. As fuel is injected, a low pressure zone develops inside 408, causing additional air to be sucked in through side passages 406 and 407. Conduit 408 is sealed by means of gasket 137 and is held in place by fastening clip 135. Fuel-air mixture is carried by conduit 408 to the injection locations in the induction tube of the motor.

Supply of the injection device with pressurized air is preferably by means of a pump which is directly driven by the combustion engine. In general, the well known positive displacement pumps are suitable. Such pumps are of the type of single or double-action membrane or piston pumps. By double-action pumps we understand those pumps where two work spaces are arranged on either side of the displacement piston. For these state of the art positive displacement pumps, the suction side volume increases about linearly with the number of revolutions.

Figures 5, 6:
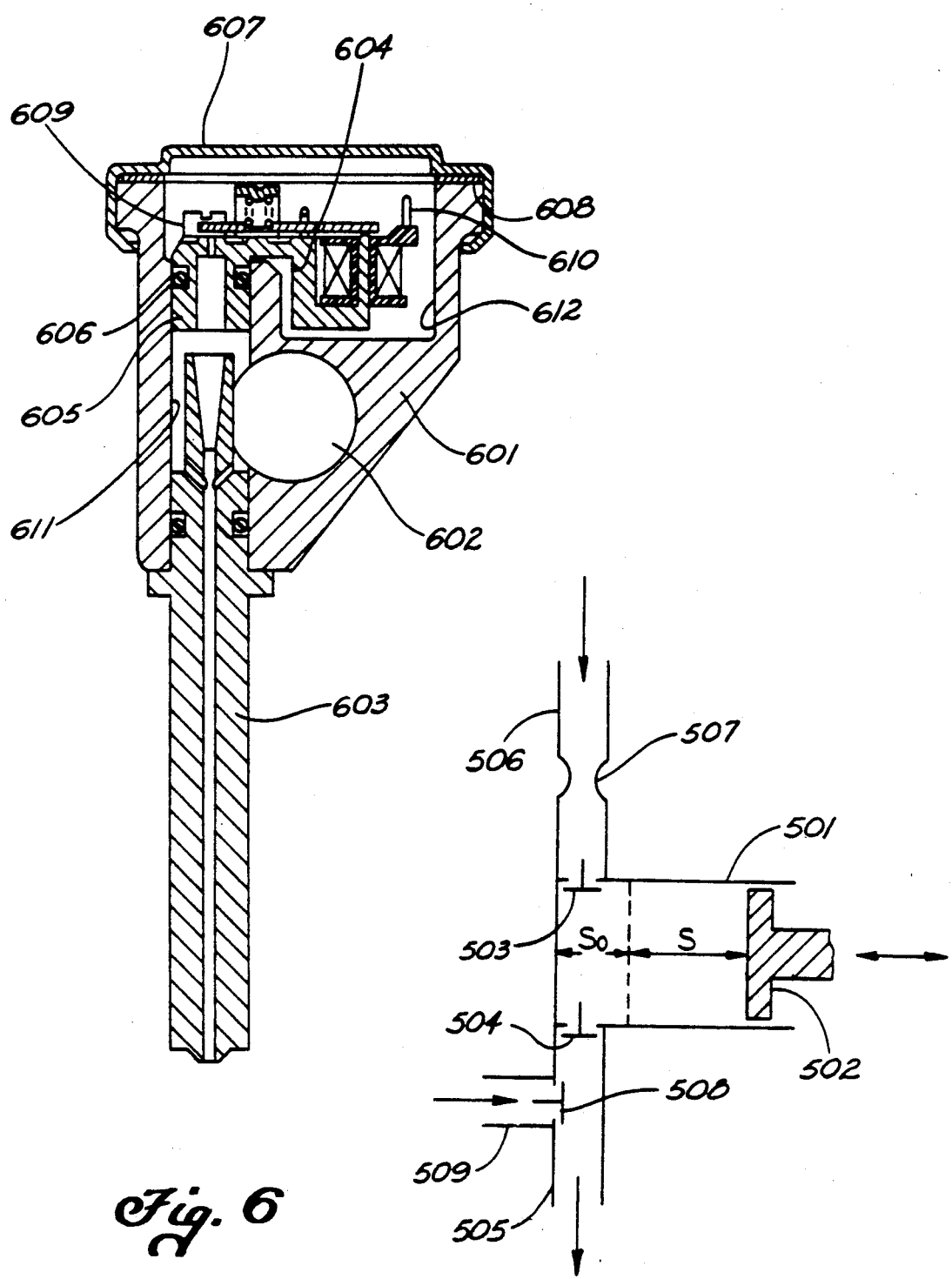
FIG. 5 is a schematic illustration relating to the device.
FIG. 6 is a vertical cross-section of a modified form of the device.

FIG. 5 shows a single-action air pump of the positive displacement type. Intake air enters via feed pipe 506, passes intake valve 503 and reaches cylinder 501. Compressed air exits via exit valve 504 into outlet pipe 505. Outlet pipe 505 is connected to the air intake connector of the injection device. Cylinder 501 contains piston 502 which goes through stroke s. The piston may be driven by a crankshaft or a cam. The upper dead center position of the piston stroke is shown by a broken line. At the upper dead center position of piston 502 remains distance $s_0$ to the cylinder cover. The remaining cylinder volume is referred to as dead-space volume.

As the revolutions per minute of the combustion motor increase, the problem arises that the volume of compressed air produced grows considerably faster than the absorptive capacity of the injection device, if no restrictive measures are taken. Because of the inadequate absorptive capacity, the compressed air pressure, without restrictive measures, far exceeds the permissible pressure. The rated volume efficiency of the usual pumps is totally unsuitable for use with the injection device. In principle, there exists the possibility to limit the compressed air pressure by means of a pressure regulator which is installed downstream from the pump. Excess air would then be bled off by the pressure controller. Such measures would, however, be burdened by a large drop in the efficiency factor of the pump and would imply additional costs.

Applicants investigations have resulted in the knowledge that the familiar positive displacement pumps can be adapted to the type of injection device described in the invention; adaptation is possible by means of special variations in the dimensions of these pumps. Adaptation of the rated pump performance to the adsorptive capacity of the injection device is by means of a significantly enlarged dead space volume for the pump. The efficiency factor of such an adaptation is considerably more favorable than that of controlled bleeding-off. In addition, the large dead space volume allows for an especially simple and cost efficient construction of the pump. The maximum air pressure produced decreases with increasing dead space volume. Dead space volume is increased to such an extent that the maximum pressure, under full load by the combustion engine, does not exceed about 2 bar. The dead space volume of a respective pump cylinder in general will be about 50% of total piston displacement. For conventional air pumps, the usual objective is to keep dead space to a minimum in order to obtain a pump with a high efficiency rating. Normally, dead space is reckoned to be 5–10% of pump displacement. By means of this considerable enlargement of dead space, in contravention of the familiar basic rules of pump design, reliable pressure limitation is achieved.

In addition, feed connector 506 can be provided with a choke section 507; its free cross-section under stationary flow conditions should be 2–4 times the total free cross-section of the fuel-mixture carrying conduits of the injection device. Exit pipe 505 can be connected with outside air via an additional intake pipe 509 and by-pass valve 508. This makes it possible to suck in additional air under the conditions where the pump, at lowest RPM's at lowest load of the engine, only delivers low air volume; under these conditions a subpressure exists at the engine induction tube which activates by-pass inlet 508.

Furthermore, the pressure pulses generated by the pump should occur synchronous with the individual injection events. By synchronizing pressure pulses with individual injection events, the precision of fuel metering can be considerably improved. For trouble free performance of the injection device with a four-cycle engine, at least one pressure pulse must occur for every two motor revolutions. Otherwise a variable, periodically rising and falling average rate of flow would result in the fuel-mix bearing conduits between sequential injection events, this in turn would have the consequence of undesirable, periodically rising and falling amounts of fuel injected. The pump is suitable driven by means of a cam attached to the shaft of the combustion motor. This also synchronizes the pressure pulses of the pump with the individual injection events in the simplest possible way. Alternatively, a suitable pump can also be driven from the crankshaft of the combustion motor by gears or belts, either at the same revolutions, or at half the revolutions of the combustion engine.

The amount of air aspirated by the pump per crankshaft revolution of the combustion engine, under idling conditions, should be about 1% of piston displacement of the combustion engine. For low RPM's, the air volume aspirated per revolution of the pump corresponds approximately to the piston displacement of the pump. By means of a correspondingly shaped double-cam, it is possible to achieve one working cycle of the pump per revolution of the crankshaft. For one pump working-cycle per revolution of the crankshaft, the pump displacement should be about 20 $cm^2$ for a combustion engine of 2 Liter displacement.

As the combustion engine starts up, the problem exists that due to the very low starting RPM's, even with relatively large pumps, no significant excess static pressure can be built up. The partial vacuum in the engine induction tube is also very low during startup and is not able to assist in a significant way in generating an air stream in the fuel conduits. Despite these conditions, with a synchronized pump drive, starting of the motor is readily possible even given the very small displacement volume of the pump. Initially, fuel piles up in the fuel conduits, more or less blocking them. Because of this blocking, pressure buildup is then possible and the fuel is blown out. This type of flow is referred to as plug-flow. Fuel preparation can be improved in this case through the mixing device described in FIG. 4. In order to bring about the fastest possible pressure buildup, no pressure accumulator should be installed between pump and injection device. Such pressure accumulators are otherwise routine in pump construction in order to dampen pressure pulsations and achieve uniform air flow. With the injection device according to the instant invention, omission of such a pressure accumulator does not cause any significant impairment of the precision of fuel metering.

Adaptation of the rated pump performance to the absorptive capacity of the injection device can be further improved by the solid state choke 507 in intake pipe 506. This results in additional limitation of the maximum flow volume. Air flow at the choke location is strongly affected by pulsations. These pulsations become stronger, the closer the choke position is to the injection device. Choke-pulsations can be decreased by interposing an accumulator between choke location and inlet valve. For an accumulator installed in this manner, resulting in uniform flow-through of the choke location, the free cross-section of the latter should be 2–4 times the total free cross-sections of all fuel-mix conduits of the injection device. If the choke location is very close to the intake valve, its necessary free cross-section must be approximately doubled because of strong pulsations.

The injection device according to the instant invention can be equipped with several electromagnetic valves so as to avoid an unfavorable excessive width and mass of the armatures. For instance, it is suitable for 6-cylinder motors, to provide two separate electromagnetic valves, arranged in the same plane, which respectively act on 3 valve seats. The valves are then electrically in a parallel circuit. The electromagnetic valves can be arranged on both sides of the pressure regulator, allowing for the most compact design of the injection device. With several electromagnetic valves installed, it is possible to supply motors with up to twelve cylinders from a single injection device.

It is also possible to arrange for several, separately triggered electromagnetic valves in a common injection device, allowing for synchronization of the individual injections with the working cycles of the respectively assigned cylinders of the combustion engine. This type of operation is called sequential injection. With this approach the formation of pollutants in the engine is reduced, allowing for engine operation with a leaner mix. With several separate electromagnetic valves a highly cost-efficient injection device results which can satisfy high demands for engine control. Arrangement of the individual injection devices directly inside a fuel manifold is especially advantageous. Such a device is shown in FIG. 6.

FIG. 6 shows a cross-section through a fuel injection device with separate valves, a cross-section through a single valve 604 is represented. The injection valves are arranged next to each other directly in fuel manifold 601. Differing from the usual design, the injection valves are mounted without housing. The principal design of the individual injection valves has already been described in published German Application P 38 34 445.9. Injection valve 604 features a flat tilt-armature and is fastened to the fuel manifold by two screws 609. In the example shown, the valve carrier of the injection valve is made as a sintered piece. At the clamping location the valve carrier features a neck, which serves to center valve 604 with respect to fuel-mix conduit 603. The neck of valve 604 is inserted into the common channel 611 of the fuel manifold 601. To seal 604, a gasket 606 is provided. The magnetic circuit of valve 604 is located directly in fuel channel 612. The magnetic coil of 604 is equipped with contact pins 610. Cabling of the individual valves is directly inside the fuel manifold 601. This makes it possible to provide electrical contact for the valves by means of a single central plug. In addition, the terminal electronic devices for triggering the injection valves can also be arranged to be inside manifold 601. This results in very good heat dissipation from the electronic parts, since they are in the fuel flow. No special cooling elements are necessary for the electronic components. Triggering of the terminal electronic devices can be done with very small cross-sectional lines, further reducing the cabling requirements. Air-manifold 602 is located below the injection valves. Air-manifold 602 intersects the individual mixing chambers, allowing for air supply to the individual conduits 603. The cross-section of air supply channel 602 should be as large as possible in order to reduce the amplitudes of pneumatic pressure variations. Manifold 601 preferably is made of light metal alloy or plastic. Manifold 601 is closed with cover 607. Cover 607 is sealed by gasket 608 and is flanged onto manifold 601. Alternatively, cover 607 can also be made of plastic, and can be joined to manifold 601 by means of ultrasonic welding. The always necessary pressure controller can be built into manifold 601, or, as a separate commercially available item, can be joined directly to the manifold.

The injection device according to FIG. 6 possesses a multiplicity of advantages in comparison with state of the art multi-point injection devices. To start, there is the advantage of the especially simple and cost effective manufacture. Due to the compound construction, a large number of individual connections are not necessary. This significantly simplifies final mounting at the motor. The injection device can be supplied to the motor manufacturer as a complete tested unit. There is little danger of improper handling and contamination by foreign materials. Compared to state of the art individual valves, considerably less danger of improper mounting exists during final assembly. The plastic fuel-mix conduits 603 can neutralize even larger tolerance deviations. In case of possible leakage at the joints of fuel-mix conduits 603 with manifold 601, only almost pure air will leak out, reducing the danger of fire hazard considerably in comparison with the conventional multi-point injectors. In case of possible accidents, fire hazard is also considerably reduced.

In addition, the injection device features significant functional advantages, when compared to the conventional multi-point injection devices with separate valves. Only very minor hydraulic pressure pulsations occur, which significantly enhances the precision of the metered amount of fuel, compared to the case for the conventional individual valves. Such pressure pulses form with the individual valves mainly in the relatively narrow connecting channels between fuel manifold and valve seats, and also inside the valve housing. Furthermore, inside the conventional individual valves very steep pressure peaks are generated by fuel being displaced by the armature movement and also from housing vibrations. In addition, in conventional individual valves the blowing out of vapour bubbles often is not readily accomplished because of the narrow connecting channels. In the injection device according to FIG. 6, pressure pulsations are largely prevented a priori by the total immersion of the valves in the fuel itself and because of the absence of a valve housing. The minor remaining pressure pulses can dissipate very quickly because of the elasticity of the fuel conduits. For a design where manifold 601 consists of plastic material, pressure pulses are virtually eliminated due to the elasticity of the material.

Due to the fact that the valves are completely surrounded by fuel, excellent hot-starting results, even for low fuel pressure. Therefore, it is quite acceptable to lower fuel pressure to atmospheric pressure directly after engine shutoff. Lowering fuel pressure after engine shutoff in the system according to FIG. 1 is done by means of a by-pass which is parallel to the pressure regulator.

The conventional individual valves tend to the formation of deposits inside the injection nozzles. This tendency increases, with increasing thermal loading of the injection nozzles. Thermal stress on the injection nozzles is exceedingly low in the injection device according to FIG. 6, again because of the fact that the flowing fuel surrounds the valves, and because of the large distance of the metering nozzles from the injection location. Thus, there is no danger here of deposit formation inside the injection nozzles.

The fuel injection device is mounted directly above the induction tube of the combustion motor. This results in only a short length of the individual fuel-mix conduits 603, usually in the order of 70 mm. Because of the short fuel-mix conduits, only a brief delay in fuel transport results. This results in very good control of time sequential fuel delivery to the individual cylinders as the individual valves are triggered. Because of the compressed air diffusion of the fuel, excellent fuel presentation is provided. The injection device is well suited to lean running of the motor.

With the low pressure difference of the transport air, the fuel can pass through the short, strait conduits (603) in a very short time, based on the kinetic energy of fuel stream alone. Therefore, even for very low differential pressure of the transport air, a fast fuel supply to the motor is guaranteed. Because of the short length of the transport conduits (603), the air supply line (602) can be designed with a large cross-section in order to reduce pneumatic pulsations. Air supply line (602) in this case acts as a pressure accumulator. Without this feature, unacceptable amplitude phase dislocations of the pressure waves between the individual valves could occur. In contrast, a pressure accumulator of this type would neither be desirable nor suitable in a device according to FIG. 1. In a device according to FIG. 1, where the metering nozzles and the pressure regulator are in close proximity, and given the symmetrical design of the unit, there is no reason to fear any significant phase dislocation. Conduits (136) in the device according to FIG. 1 must be of significant length, 300-400 mm, to establish connection of the device with the motor. Therefore, in a device according to FIG. 1, omission of a pressure accumulator results in shorter fuel transport times under unfavourable running conditions, as has been described previously.

Significant improvements in diffusion can be obtained by adding a special spray-diffuser at the end of each transport conduit. To this effect, conduit 603 can be arranged to be inside an outer jacketing tube which is directly joined to mixing chamber 611. This outer jacket tube takes a side stream of air from mixing chamber 611 and conducts it in the outer passage to the diffuser device which is installed further downstream. The fuel-mix which was prepared in the mixing chamber passes then through the downstream diffuser device into the induction tube of the motor. The advantage of adding a downstream diffuser is to be found in the fact the internal cross-section of the transport conduit can be made relatively large in order to avoid wetting the walls of the conduit tubes with fuel. Undesired wetting of the walls reduces fuel transport speed and impairs the quality of fuel diffusion. Wetting of the walls is caused by off-centered or canted installation of the conduits with respect to the fuel stream exiting from the metering nozzle. Under practical conditions, due to tolerance limits, fuel contact with the wall can never be completely avoided. The limits which need to be imposed on the amount of diffuser-air are set by means of a relatively small cross-sectional flow diameter of the downstream diffuser device. This cross-sectional flow diameter should be in the order of 1-2 mm$^2$. This side-stream air is conducted through the jacket and fed concentrically past the outlet of conduit 603 into the diffuser device. Any number of conventional diffuser designs can be used. The diffuser may for instance consist of a Laval nozzle or can be a sharp-edged cone. In addition, conventional diffusers may also be directly joined to the transport conduits.

As is well known, fuel preparation can be considerably improved by heating of the mix component. With the device according to the instant invention, due to the good heat dissipation through the fuel, and the total immersion of the injection nozzles, no performance difficulties need be expected from vapour bubble formation. Therefore, the use of familiar heating measures is especially appropriate for the device according to the instant invention. For example, the injection device can be supplied with heated air, or even with off-gas from the motor. Heating the fuel-mix conduits is especially advantageous. Heating may also be by electrical means, so as to add heat even during motor startup. To this effect electrical resistance heating wires can, for instance, be considered inside the conduits. Furthermore, by heating the transport conduits, the formation of film-flow along the walls of the conduits can be prevented, even for very low differential pressure of the transport air. Heating allows for a considerably improved fuel atomization when the system is provided with atmospheric pressure air.

Figure 7B:
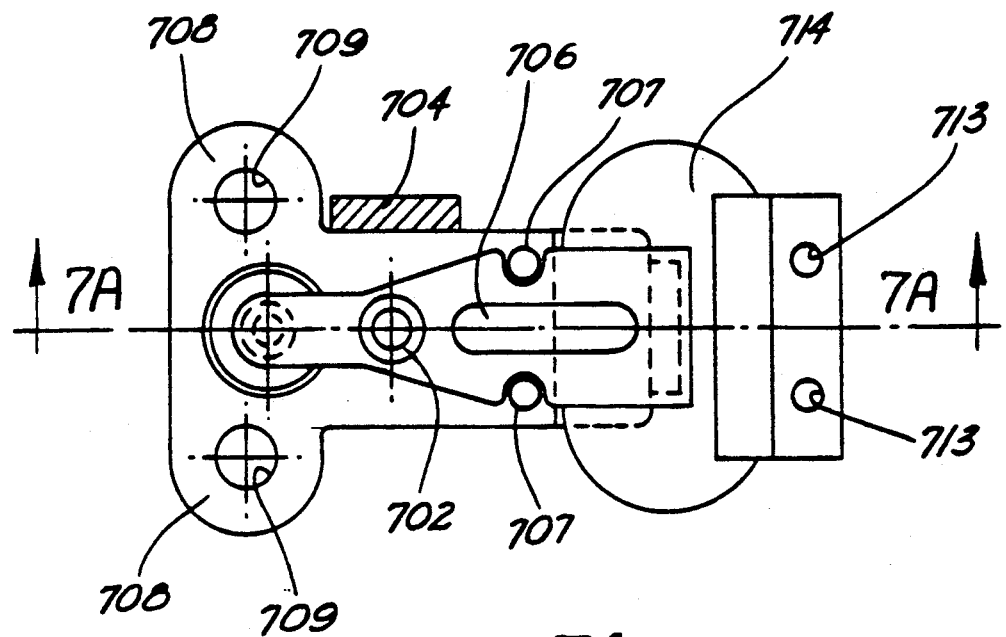
Figure 7A:
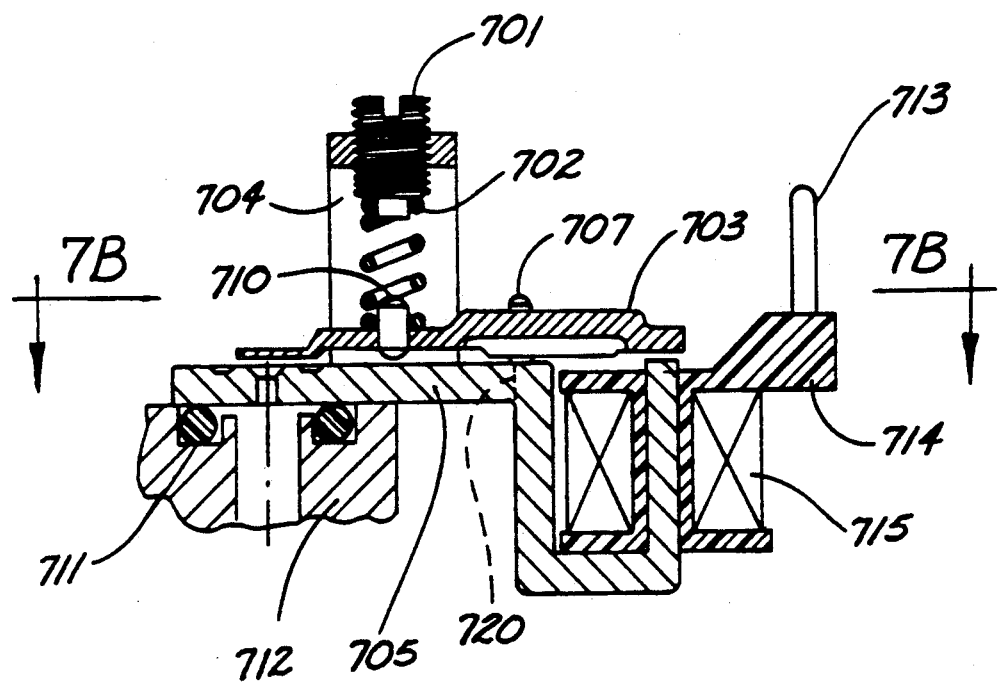
FIG. 7a is a fragmentary cross-section of a modified form, as taken along line 7B—7B in FIG. 7b.

An especially simple design of an injection valve suitable for use with the device is shown in FIG. 7. FIG. 7a shows a cross-sectional view along line B—B, FIG. 7b gives a top view of the valve as defined by line A—A. Identical parts are marked with the same reference numbers.

Valve carrier 705 of the injection valve consists of a single stamped sheeting part and is of low retentivity material. Valve carrier 705 features two side-brackets 708 which contain fastening holes 709. The valve is thread-connected at brackets 708 inside fuel manifold 712. To seal the valve at the contact location of valve carrier 705, a gasket ring 711 is provided. On valve carrier 705 is an upwards directed flange 704, which carries calibration screw 701. Calibration screw 701 serves to set the force of reset spring 702. The force exerted by reset spring 702 should preferably be about 1-2 N. Reset spring 702 forces armature 703 onto valve carrier 705. Armature 703 contains a non-magnetic pin 710 which is pressure fitted. Pin 710 is additionally fixed to armature 703 by laser welding and serves as armature stop and as guidance for reset spring 702. Sidewise guidance for the armature is provided by the two pins 707. Armature 703 is also stamped with the impression 706 for improved flexural resistance. Magnet coil 715 is on coil body 714, which is slipped onto the magnet pole, and also carries contact pins 713. The valve seat is machined into valve carrier 705. Valve carrier 705 is flat-finished. Armature 703, together with pressure fitted pin 710, is finished by grinding the bottom side, and the back edge of armature 703 is undercut by the height of the armature stroke. The permanent air gap is formed by a thin non-magnetic coating of armature 703 or valve carrier 705.

The special advantage of the valve according to FIG. 7 over conventional valve designs is in the extraordinarily low manufacturing costs but, nevertheless, improved functional performance. Armature 703 is very low in mass, amounting only about to 0.3-0.4 g. Armature length is about 15 mm, width about 4 mm. Due to the rotational movement of the armature, only a small part of armature mass is involved with the complete stroke. Thus, the equivalent mass to an armature with linear movement is only about 0.1 g. Conventional single valves, with a needle valve, in contrast have armature masses of from 2-4 g. The low armature mass allows for extraordinarily fast floating movements. Using conventional triggering circuitry, on over-excitation of the valve during energizing, closing times of less than 0.3 ms can be achieved. Therefore, due to the very high working speed of the valve, calibration of the reset spring is generally not necessary. Alternatively, the valve can also be equipped with a magnetic coil with very high electrical resistance, thus reducing the absorption of electrical energy. For example, the magnetic coil can have a resistance of up to 60 Ohms, for more than 1000 windings, still allowing for closing times of less than 1 ms. For such high coil resistance values, a calibration of the reset spring should, however, be considered, as is proposed in FIG. 7.

Alternatively, the coil carrier may also be composite of several parts. The magnetic circuit can consist of a U-shaped segment, which is welded to the valve carrier along dotted line 720. The permanent air gap is ground into the magnet pole which is located at the junction shown by the dotted line. This, first of all, results in the advantage that the valve carrier can be made of non-magnetizable material. With a non-magnetizable valve carrier higher attractive forces are generated, since in this case no magnetic forces acting in the opposite direction to armature attraction are generated in the valve carrier region. A further advantage results from the ability to omit the otherwise required non-magnetizable coatings. Also, bracket 704 can be executed as a separate part. Bracket 704 can then be provided with extensions which are jointly threaded with the valve carrier. The advantage of such a design is to be found in mechanical relief for the valve carrier. Calibration of the spring force of reset spring 702 can then be simply done by bending the bracket.

In conclusion, we wish to restate that, in place of compressed air, the fuel injection device according to the instant invention can also be driven with air at atmospheric pressure, or with off-gases from the combustion motor. The advantage of this resides in the lowered cost from the absence of the air pump. However, a considerable impairment of fuel preparation must then be allowed for. In addition, with slight modifications, the device can also be used to advantage with other injection procedures for fuel metering. For instance, the device can supply several injection valves in series arrangement which serve for the direct injection of fuel into the combustion area of the motor. The listed dimensions, as well as the methods for joining individual parts, are to be considered as especially suitable, but only by way of examples. Pressure fitting may for instance be replaced by screw connections. Such simple modifications are readily apparent to those skilled in the art.

Additional suitable designs and variants of the fuel injection device can be deduced from the claims.

I claim:

1. A fuel injection device for the injection of fuel into an induction tube of a combustion motor, consisting of several electromagnetic injection valves, a fuel distribution manifold, and a fuel pressure regulator, characterized by the fact that the injection valves (604) are completely surrounded by the fuel distribution manifold (601), and that the injection valves, without any valve housing, are directly built into said fuel distribution manifold (601) and are completely immersed in fuel.

2. A fuel injection device according to claim 1, characterized by the fact that cabling of the individual valves (604) is arranged directly inside said fuel distribution manifold (601), and that the valves are electrically connected by means of one centrally located plug, which is located on the injection device.

3. A fuel injection device according to claim 2, characterized by the fact that terminal electronics for triggering the injection valves are also located inside the fuel distribution manifold (601).

4. A fuel injection device according to claim 3, characterized by the fact that the terminal electronics for triggering the injection valves are directly connected to the injection valves and are tested together with the respective injection valve as a compound mounting segment.

5. A fuel injection device according to claim 1, characterized by the fact that said fuel distribution manifold (601) is equipped with several mixing devices (603) for fuel preparation, said mixing devices being connected with the respective injection locations by means of small internal diameter conduits, and further characterized by the fact that the fuel is transported to the individual injection locations with the assistance of air.

6. A fuel injection device according to claim 5, characterized by the fact that inside said fuel distribution manifold (601) and located below the injection valves, an air supply line (602) is provided for, which intersects the individual mixing chamber spaces (611).

7. A fuel injection device according to claim 1, characterized by the fact that a non-magnetic valve carrier (705) of the electromagnetic valves consists of a single stamped sheeting part, and by the fact that a magnetic circuit of the valves consists of U-shaped yoke which is solidly connected to the valve carrier (705) by laser welding, and further characterized by the fact that a permanent air gap in the magnetic pole at a junction location (720) is machined by grinding.

8. A fuel injection device for the injection of fuel into an induction tube of a combustion motor, said device being a compound unit for installation which has at least one electromagnetic metering valve, several metering nozzles, several mixing devices for fuel preparation, and a fuel pressure regulator, and where the conveyance of fuel to the individual injection locations is done with the assistance of air, and where said device is characterized by the fact that the at least one electromagnetic valve features at least one valve seat (123) and at least one working pole (113), and that these valve seat and working pole units are arranged at the opposite ends of a flat tilt-armature (108) which has a fulcrum between such valve seat and such pole, and that the electromagnetic valve simultaneously allows for fuel supply to said several metering nozzles (122).

9. A fuel injection device according to claim 8, characterized by the fact that the tilt-armature of the electromagnetic valve obtains lateral guidance from two pins (109, 707) which are pressure fitted into a valve carrier (102, 705), and by the fact that the tilt-armature of the electromagnetic valve is equipped with a detent pin (710), of non-magnetizable material, and that said pin is located with a reset spring.

10. A fuel injection device according to claim 8, characterized by the fact that magnetic return flow for the electromagnetic valve is by means of a U-shaped yoke (204) which itself is clamped by a magnetic core (203), and is solidly joined with a valve carrier (102, 201, 705) which consists of non-magnetizable material, and by the fact that at the region of side-poles (209) two permanent air gaps are arranged for.

11. A fuel injection device according to claim 8, characterized by the fact the electromagnetic valve comprises a magnetic circuit which features two magnet cores (307 and 308) which are solidly joined to a non-magnetizable valve carrier (102, 301, 705), by means of pressure fitting, and by the fact that a permanent air gap is provided by a non-magnetizable valve carrier.

12. A fuel injection device according to claim 8, characterized by the fact the tilt-armature of the electromagnetic valve and a membrane of the fuel pressure regulator are located in a common plane, and that the fuel pressure regulator membrane is clamped between a valve carrier (102) and a housing cover (101).

13. A fuel injection device according to claim 8, characterized by the fact that the tilt-armature (108) of the electromagnetic valve is provided with several lamellar extensions (132) in the region of said valve seats (123), and that the thickness of these extensions is about 0.1–0.2 mm.

14. A fuel injection device according to claim 8, characterized by the fact the injection device features several electromagnetic valves in a common plane, and that its tilt-armature (108) cooperates with said several metering nozzles (122).

15. A fuel injection device according to claim 8, characterized by the fact that a supply of air occurs to a diffuser device through at least one channel (404) which is slanted and points to the individual metering nozzles, so that fuel is injected roughly into a stagnation point of the air.

16. A fuel injection device according to claim 8, characterized by the fact that transport conduits (136, 408, 603) are provided with a tapered entry section (138, 411).

17. A fuel injection device for the injection of fuel into an induction tube of a combustion motor, consisting of at least one electromagnetic metering valve, at least one mixing device for fuel preparation, a fuel pressure regulator and an air pump which is mechanically driven by the combustion motor, and where the transport of fuel to the individual injection locations occurs by means of compressed air, said device being characterized by the fact that the mechanically driven air pump features a large dead space volume which comprises at least 30% of the displacement volume of the air pump.

18. A fuel injection device according to claim 12, characterized by the fact that pressure pulses produced by the pump are synchronous with the individual injection events, so that at least one pressure pulse form the pump occurs per two motor revolutions.

19. A fuel injection device according to claim 17, characterized by the fact that in an intake line (506) of the pump a solid state choke (507) is arranged, this choke location is characterized by the fact that its cross-section, under stationary flow conditions is about 2–4 times the total free cross-section of all fuel-mix carrying conduits of the injection device, while, under non-stationary flow conditions, the cross-sectional diameter at the choke location is 4–8 times said total free cross-section of all fuel-mix carrying conduits.

20. A fuel injection device for the injection of fuel into an induction tube of a combustion motor, consisting of at least one electromagnetic metering valve, several mixing devices for fuel preparation and a fuel pressure regulator, where the transporting of the fuel is air-assisted, and where the mixing devices feature a fuel feed adapter (411) which is connected to the injection location by means of a conduit of about 0.8–1.2 mm diameter, and where the fuel is injected into the feed adapter (411) and then concentrically surrounded by air for diffusion, characterized by the fact that downstream from said adapter (411) at least one additional passage (406) for the admission of air is provided.

21. A fuel injection device according to claim 20, characterized by the fact that a partial stream of air intended for fuel diffusion streams along the outside of said fuel feed adapter (411) towards at least one side passage (406, 407), and by the fact that a partial stream of pure air or off-gases flows to the orifice region of transport conduits (136, 408, 603) and concentrically envelops same.

* * * * *